United States Patent Office 3,072,725
Patented Jan. 8, 1963

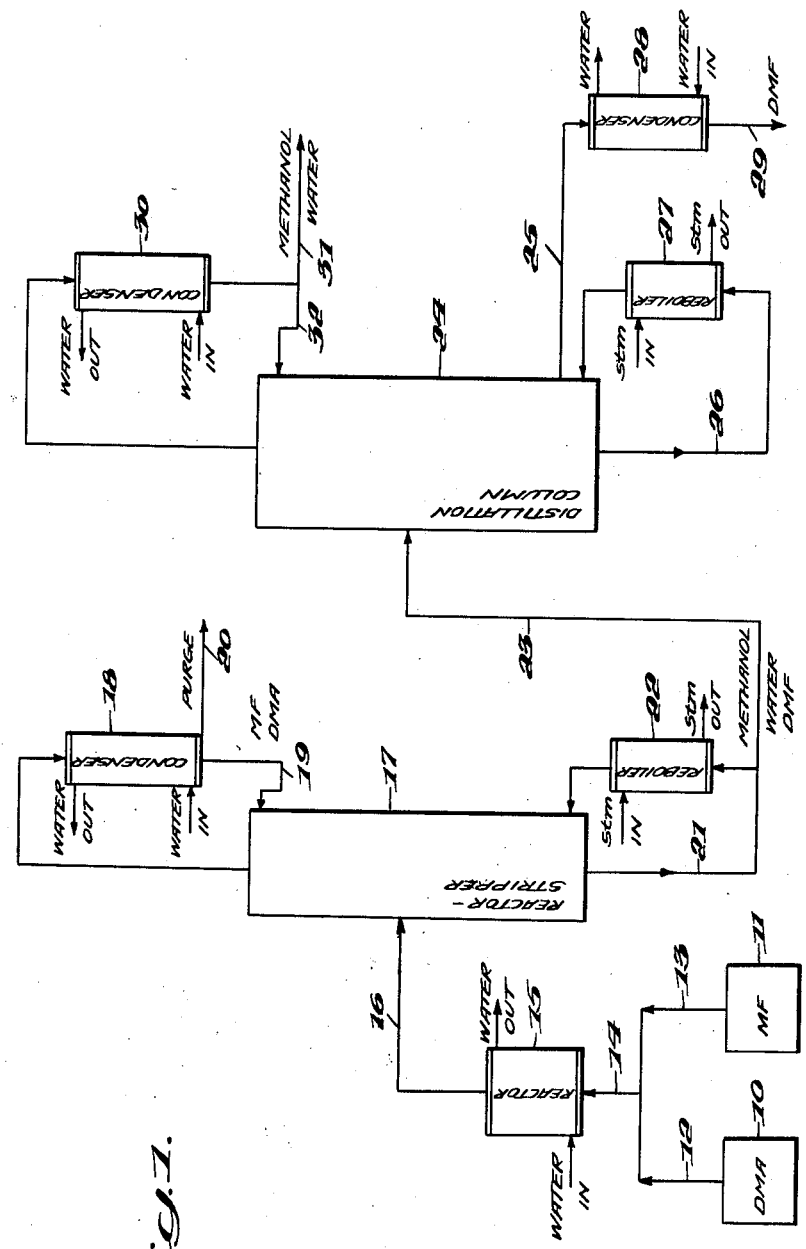

3,072,725
PREPARATION OF DIMETHYLFORMAMIDE
Robert Clemens Surman, Pasadena, Tex., assignor to E. I. du Pont de Nemours and Company, Wilmington, Del., a corporation of Delaware
Filed Nov. 14, 1960, Ser. No. 69,185
3 Claims. (Cl. 260—561)

This invention relates to a continuous process for preparing dimethylformamide. More particularly this invention relates to acidity or basicity control in continuously preparing dimethylformamide in exceptionally high yield.

Heretofore dimethylformamide has been prepared on a batchwise basis by the reaction of dimethylamine and methyl formate, which gives a reaction mass containing dimethylformamide, methanol, unreacted dimethylamine, methyl formate and any water that was introduced as an impurity with the reactants. This reaction product was then distilled batchwise to separate the dimethylformamide. Upon converting this batch process to a continuous process, difficulty was encountered in controlling product quality and yield. It was found in the continuous process that the amount of contact occurring between dimethylformamide and $H_2O$ in the distillation column promotes a side reaction by which formic acid is produced. Also, it was found that complete conversion of reactants could be obtained only by separating the product from the reactants as the reaction proceeds. It would therefore prove beneficial to obtain a simple continuous dimethylformamide process whereby product quality can be controlled and the amount of acidic impurities in the dimethylformamide is minimized so that dimethylformamide of high purity is produced.

The process of this invention is accomplished by providing a continuous process for preparing dimethylformamide in exceptionally high yield which comprises contacting methyl formate with about a molar equivalent amount of dimethylamine and passing the resulting mixture through a reaction zone under pressure, passing the reaction products into a heated distillation zone thereby vaporizing and separating unreacted dimethylamine and methyl formate from the resulting liquid reaction products, condensing and returning the unreacted dimethylamine and methyl formate to the top of the distillation zone as reflux thereby reacting the unreacted dimethylamine with the unreacted methyl formate, removing the liquid reaction products (methanol and dimethylformamide) from the bottom of this distillation zone and passing them into a second distillation zone, heating and vaporizing the liquid reaction products in the distillation zone, separating water and methanol from the dimethylformamide in the distillation zone, removing the vaporized water and methanol from the distilation zone, condensing the vaporized water and methanol and maintaining a reflux ratio of about 1.5 to 1 thereby maintaining the dimethylformamide as a neutral product and removing from the bottom of the second distillation zone dimethylformamide as the resulting product. Such a process will be described in detail hereinafter, reference being had to the accompanying drawing which illustrates schematically the process of this invention.

With reference to the drawing, the dimethylamine from a storage tank 10 and methyl formate from a storage tank 11 are continuously pumped under a pressure of about 50 p.s.i.g. through lines 12 and 13 respectively, mixed and forced through line 14 to the reactor 15. This reaction zone is a shell and tube heat exchanger that operates at about 50 p.s.i.g. and within the exit process temperature range of 110 to 120° C. About 90 percent of the reaction between dimethylamine and methyl formate is carried out here. Since the reaction is exothermic and very much slower in the vapor phase than in the liquid phase, the heat exchanger is required to hold the reactants in the liquid phase. For this reason it is water cooled. The reactor is under pressure in order to permit its operation at a maximum liquid temperature and therefore at a maximum reaction rate and a minimum heat exchanger surface area.

The products of the reaction, methanol, dimethylformamide, any unreacted dimethylamine and methyl formate, and a small amount of water (0.10 to 0.60%) that is contained in the reactants as a starting impurity are introduced through line 16 into a distillation column 17 of reduced pressure that acts as a reactor-stripper. This column operates within a pressure range of 35 to 45 p.s.i.g. but preferably at about 40 p.s.i.g. It has a performance equivalent of 30 actual plates, has a top temperature range of 40 to 110° C. but preferably operates at about 92° C., and has a bottom temperature range of 80 to 150° C. but preferably operates at about 118° C. The feed containing only 5 to 10% of the original methyl formate enters near the center of column 17 through line 16. This unreacted methyl formate together with the unreacted dimethylamine are distilled away from the higher boiling liquid reaction products dimethylformamide and byproduct methanol. This removal of both of the liquid reaction products provides a favorable medium for completion of the reaction in the upper portions of the column. The distillate from this column is totally condensed in condenser 18 and returned as reflux back to the top of the column through reflux line 19. Only a small purge is withdrawn through line 20 to prevent build-up of a small quantity of trimethylamine which is usually present in the dimethylamine fed to the column. Since the reaction proceeds much more rapidly in the liquid rather than the vapor phase, some holdup may be provided in the reflux line to further assure reaction completion. The bottoms from this reactor-stripper 17 are all of the by-product methanol, the water impurity, and the product dimethylformamide essentially free of dimethylamine and methylformate. These liquid reaction products are removed through line 21, part recycled through a reboiler 22 and returned near the bottom of the column 17 as vapor and the remainder passed through line 23 into a distillation column 24. This column operates within a pressure range of 0.2 to 2.0 atmospheres but preferably at about atmospheric pressure. It has a performance equivalent of 30 actual plates, has a top temperature range of 40 to 90° C. but preferably operates at about 65° C., and has a bottom temperature range of 110 to 180° C. but preferably operates at about 160° C. The liquid reaction products from the reactor-stripper 17 are fed continuously into the distillation column 24. From this column dimethylformamide of high purity is drawn off near the bottom of the column as a vapor side-stream through line 25 and then conducted through a condenser 28. The resultant neutral product is then piped to storage through line 29. The liquid dimethylformamide in the base of the column leaves the bottom of the column through line 26, recycled through a reboiler 27 and returned near the bottom of the column 24 as vapor.

Methanol and the small quantity of water are drawn off the top of the column as a vapor and condensed in the condenser 30. A portion of the distilled methanol is taken off as overhead product through line 31 and the remainder is recycled back to the top of column through line 32 to maintain the desired reflux ratio. It has been found that the reflux ratio not only affects the degree of product separation but also unexpectedly affects product purity. This occurs because the water vapor present promotes a side reaction in the distillation column with the dimethylformamide to produce formic acid. Because dimethylformamide and formic acid form a maximum boiling azeotrope, the formic acid travels down the column and appears in the bottom product as an acidic impurity. By controlling the reflux ratio and thus the water hold up time in the column the amount of acidic impurities in the dimethylformamide is minimized and a normally neutral or slightly basic product can be produced. The neutral, or highest purity, product can be made at about a 1.5 to 1 reflux ratio at a feed plate column temperature range of 120 to 125° C. at atmospheric pressure.

In order to better understand the invention, reference is had to the following example:

Dimethylamine at a flow rate of 618 pounds per hour and containing additionally as impurities 1.1 pounds per hour of trimethylamine and 2.3 pounds per hour of water are mixed with methyl formate flowing at a rate of 822 pounds per hour. This mixture is then forced through a water cooled, shell and tube reactor under 50 p.s.i.g. pressure. 90% of the reaction is completed in the reactor.

The reaction mixture is fed continuously to the middle of a 30 plate distillation column at a rate of 1443.5 pounds per hour.

This reactor-stripper column is operated at 40 p.s.i.g. pressure, has a temperature at the top of the column of 92° C., and has a temperature at the bottom of the column of 118° C., 150 p.s.i.g. steam at a rate of 216 pounds per hour is used in the reboiler.

The liquid overhead stream is totally refluxed except for the removal of a small purge containing 21 pounds per hour of methanol, 1.1 pounds per hour of dimethylamine and 1.1 pounds per hour of trimethylamine.

The bottoms from the reactor-stripper column containing 1000 pounds per hour of dimethylformamide, 418 pounds per hour of methanol, and 2.3 pounds per hour of water are continuously fed to the middle of a 30 plate second distillation column.

This column operates at atmospheric pressure, has a temperature at the top of the column of 65° C., and a temperature at the bottom of the column of 160° C. The reboiler for this column uses 300 p.s.i.g. steam at a rate of 1078 pounds per hour.

The liquid overhead product containing methanol and water is maintained at a 1.5 reflux ratio. Drawn off as the overhead products are 418 pounds per hour of methanol and 2.3 pounds per hour of water.

The pure bottom product, dimethylformamide, is taken off near the bottom of the column as vapor at a rate of 1000 pounds per hour.

Dimethylformamide is a known useful commercial product that has various applications. Its outstanding use characteristic is its solvent power for a wide variety of difficulty soluble organic and inorganic materials.

What is claimed is:

1. A continuous process for preparing dimethylformamide in exceptionally high yield which comprises contacting methyl formate with dimethylamine and passing the resulting mixture through a reaction zone under pressure, passing the reaction products into a pressurized and heated distillation zone thereby vaporizing and separating unreacted dimethylamine and methyl formate from the resulting liquid reaction products, condensing and returning said unreacted dimethylamine and methyl formate to the top of said distillation zone thereby reacting said unreacted dimethylamine with said unreacted methyl formate, removing the liquid reaction products from the bottom of said distillation zone and passing them into a second distillation zone, heating and vaporizing the liquid reaction products in said second distillation zone, separating water and methanol from said dimethylformamide in said second distillation zone, removing the vaporized water and methanol from said second distillation zone, condensing said vaporized water and methanol and maintaining a reflux ratio of about 1.5 to 1 thereby maintaining said dimethylformamide as a neutral product, and removing from said second distillation zone dimethylformamide as the resulting product.

2. A continuous process for preparing dimethylformamide in exceptionally high yield which comprises contacting methyl formate with about a molar equivalent amount of dimethylamine and passing the resulting mixture through a reaction zone under a pressure of about 50 p.s.i.g., passing the reaction products into a heated distillation zone having a top temperature of about 92° C. and a bottom temperature of about 118° C. and operating at a pressure of about 40 p.s.i.g. thereby vaporizing and separating unreacted dimethylamine and methyl formate from the resulting liquid reaction products, condensing and returning said unreacted dimethylamine and methyl formate to the top of said distillation zone thereby reacting said unreacted dimethylamine with said unreacted methyl formate, removing the liquid reaction products from the bottom of said distillation zone and passing them into a second distillation zone having a top temperature of about 65° C. and a bottom temperature of about 160° C. and operating at about atmospheric pressure, heating and vaporizing the liquid reaction products in said second distillation zone, separating water and methanol from said dimethylformamide in said second distillation zone, removing the vaporized water and methanol from said second distillation zone, condensing said vaporized water and methanol and maintaining a reflux ratio of about 1.5 to 1 thereby maintaining said dimethylformamide as a neutral product, and removing from said second distillation zone dimethylformamide as the resulting product.

3. A continuous process for preparing dimethylformamide in exceptionally high yield which comprises contacting methyl formate with about a molar equivalent amount of dimethylamine and passing the resulting mixture through a reaction zone under a pressure of about 50 p.s.i.g. and exiting at a temperature within the range of 110°–120° C., passing the reaction products into a heated distillation zone having a top temperature within the range of 40°–110° C. and a bottom temperature within the range of 80°–150° C. and operating at a pressure within the range of 35–45 p.s.i.g. thereby vaporizing and separating unreacted dimethylamine and methyl formate from the resulting liquid reaction products, condensing and returning said unreacted dimethylamine and methyl formate to the top of said distillation zone thereby reacting said unreacted dimethylamine with said unreacted methyl formate, removing the liquid reaction products from the bottom of said distillation zone and passing them into a second distillation zone having a top temperature within the range of 40°–90° C. and a bottom temperature within the range of 110°–180° C. and operating at a pressure within the range of 0.2–2 atmospheres, heating and vaporizing the liquid reaction products in said second distillation zone, removing the vaporized water and methanol and maintaining a reflux ratio of about 1.5 to 1 thereby maintaining said dimethylformamide as a neutral product, and removing from said second distillation zone dimethylformamide as the resulting product.

References Cited in the file of this patent

UNITED STATES PATENTS

| 2,092,723 | Brill et al. | Sept. 7, 1937 |
| 2,667,451 | Larson | Jan. 26, 1954 |
| 2,667,511 | Downing | Jan. 26, 1959 |